(12) United States Patent  
Guan

(10) Patent No.: US 8,446,718 B2  
(45) Date of Patent: May 21, 2013

(54) DISK DRIVE BRACKET

(75) Inventor: Zhi-Bin Guan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 303 days.

(21) Appl. No.: 12/912,770

(22) Filed: Oct. 27, 2010

(65) Prior Publication Data

US 2012/0087082 A1   Apr. 12, 2012

(30) Foreign Application Priority Data

Oct. 11, 2010   (TW) ................................ 99134570 A

(51) Int. Cl.
*G06F 1/16* (2006.01)

(52) U.S. Cl.
USPC ................ 361/679.33; 165/185; 248/309.1; 360/97.13; 312/327

(58) Field of Classification Search
USPC ............... 165/104.26, 104.33, 104.21, 80.2, 165/84, 121, 185; 248/305, 449, 458, 213.2, 248/442.2, 224.8, 220.21, 309.1, 316.1; 360/97.01, 245.1, 97.16, 99.13, 69, 99.08, 360/99.16, 97.13, 234, 97.12, 110, 113, 245, 360/97.15; 361/679.01, 679.02, 679.03, 679.31, 361/679.32, 679.37, 679.33, 679.38, 679.58, 361/679.39, 679.4, 679.57; 343/702, 700 MS; 312/223.1, 223.2, 327, 332.1
See application file for complete search history.

(56) References Cited

U.S. PATENT DOCUMENTS

| | | | | |
|---|---|---|---|---|
| 6,130,817 A | * | 10/2000 | Flotho et al. | 361/679.31 |
| 2007/0014045 A1 | * | 1/2007 | Kim et al. | 360/97.01 |
| 2008/0316117 A1 | * | 12/2008 | Hill et al. | 343/702 |
| 2011/0000649 A1 | * | 1/2011 | Joshi et al. | 165/104.26 |
| 2011/0114808 A1 | * | 5/2011 | Huang et al. | 248/305 |

* cited by examiner

*Primary Examiner* — Hung Duong  
(74) *Attorney, Agent, or Firm* — Altis Law Group, Inc.

(57) ABSTRACT

A disk drive bracket includes a receiving box for receiving a disk drive and a thermal-dissipating module wrapped on and in contact with an exterior surface of the receiving box. The thermal-dissipating module includes a number of fins extending from the thermal-dissipating module opposite to the receiving box.

11 Claims, 4 Drawing Sheets

DISK DRIVE BRACKET

BACKGROUND

1. Technical Field

The present disclosure relates to disk drive brackets, and more particularly, to a disk drive bracket with high heat dissipation efficiency.

2. Description of Related Art

Due to the development of computer science, the storage capacities of disk drives have increased and the read-write speeds have become faster, so disk drives generate large amounts of heat during operation. Thus, how to rapidly exhaust the heat generated by disk drives during operation and thereby prevent the disk drives from overheating and failing to operate has become a major problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
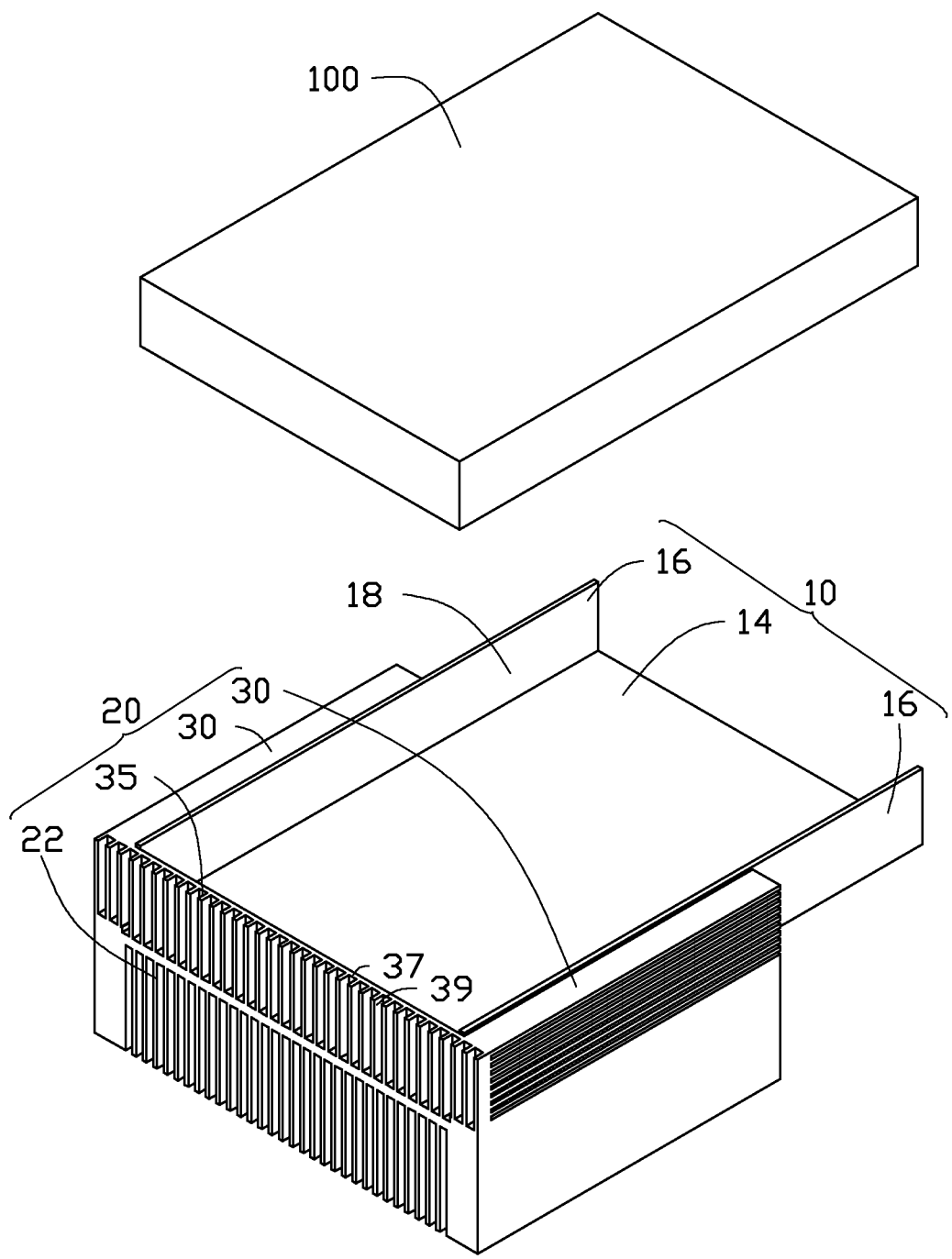
FIG. 1 is an isometric view of an exemplary embodiment of a disk drive bracket, together with a disk drive.
Figure 2:
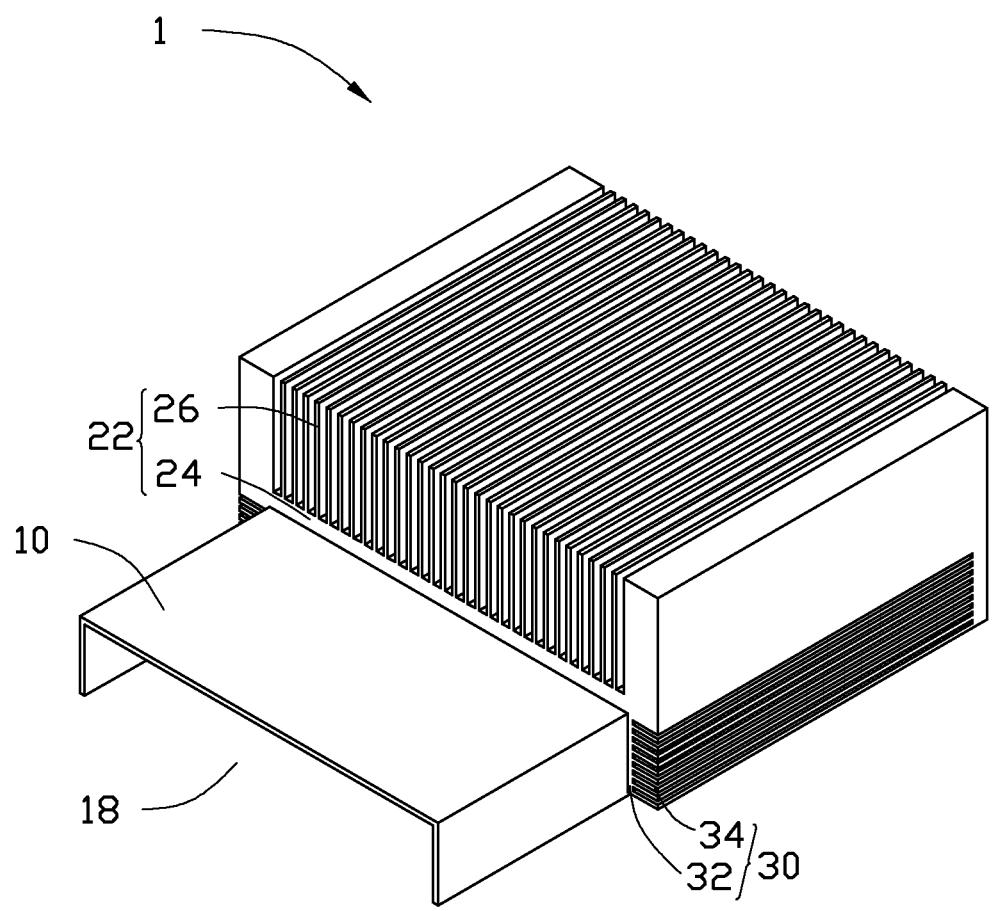
FIG. 2 is an inverted view of the disk drive bracket of FIG. 1.

Referring to FIGS. 1 and 2, a disk drive bracket 1 in accordance with an exemplary embodiment is used to receive a disk drive 100. The disk drive bracket 1 includes a receiving box 10 and a thermal-dissipating module 20 wrapped on and in direct contact with an exterior surface of the receiving box 10. The receiving box 10 includes a support board 14 and two sidewalls 16 substantially perpendicularly extending from opposite sides of the support board 14. The support board 14 and the sidewalls 16 bound a receiving space 18 for receiving the disk drive 100.

The thermal-dissipating module 20 includes a first thermal-dissipating portion 22 disposed on an exterior surface of the support board 14 of the receiving box 10. Two second thermal-dissipating portions 30 are respectively disposed on exterior surfaces of the sidewalls 16 of the receiving box 10 and connected to opposite sides of the first thermal-dissipating portion 22. A third thermal-dissipating portion 35 is positioned at an end of the support board 14 and is flush with the first and second thermal-dissipating portions 22 and 30. The first thermal-dissipating portion 22 includes a base wall 24 in direct contact with the exterior surface of the support board 14 and a plurality of fins 26 substantially perpendicularly extending from the base wall 24 opposite to the support board 14. Each second thermal-dissipating portion 30 includes a base wall 32 in direct contact with the exterior surface of the corresponding sidewall 16 and a plurality of fins 34 substantially perpendicularly extending from the base wall 32 opposite to the corresponding sidewall 16. The third thermal-dissipating portion 35 includes a base wall 37 substantially perpendicularly connected among the base walls 24 and 32 of the first and second thermal-dissipating portions 22 and 30, and a plurality of fins 39 substantially perpendicularly extending from the base wall 37 opposite to the end of the support board 14.

Figure 3:
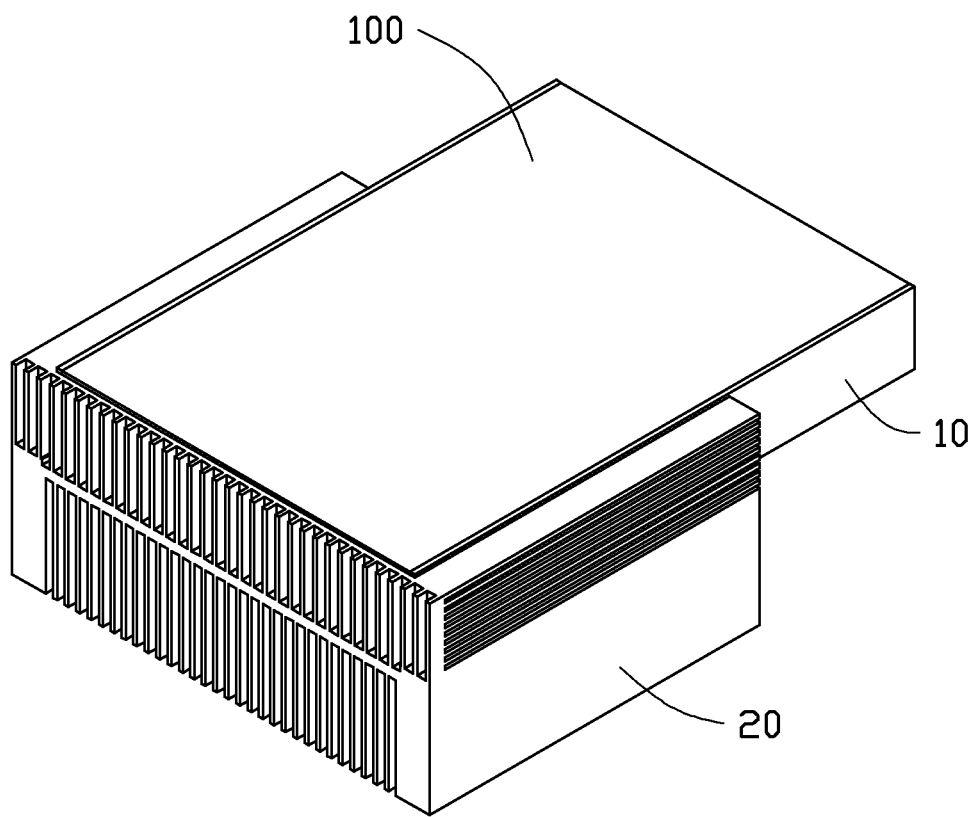
FIG. 3 is an assembled, isometric view of the disk drive bracket and the disk drive of FIG. 1.

Referring to FIG. 3, in use, the disk drive 100 is fixedly received in the receiving space 18 of the receiving box 10, with an exterior surface of the disk drive 100 in direct contact with an interior surface of the receiving box 10. Thus, heat generated by the disk drive 100 is conducted to the receiving box 10, and is further conducted to the fins 26, 34, and 39 through conduction of the corresponding base walls 24, 32, and 37, which are in direct contact with the exterior surface of the receiving box 10. Because the fins 26, 34, and 39 have great heat dissipation area, as such heat is rapidly dissipated to the environment by the enhanced efficiency of heat radiation and heat convection. Thus, the disk drive 100 can keep a range of low operation temperature.

Figure 4:
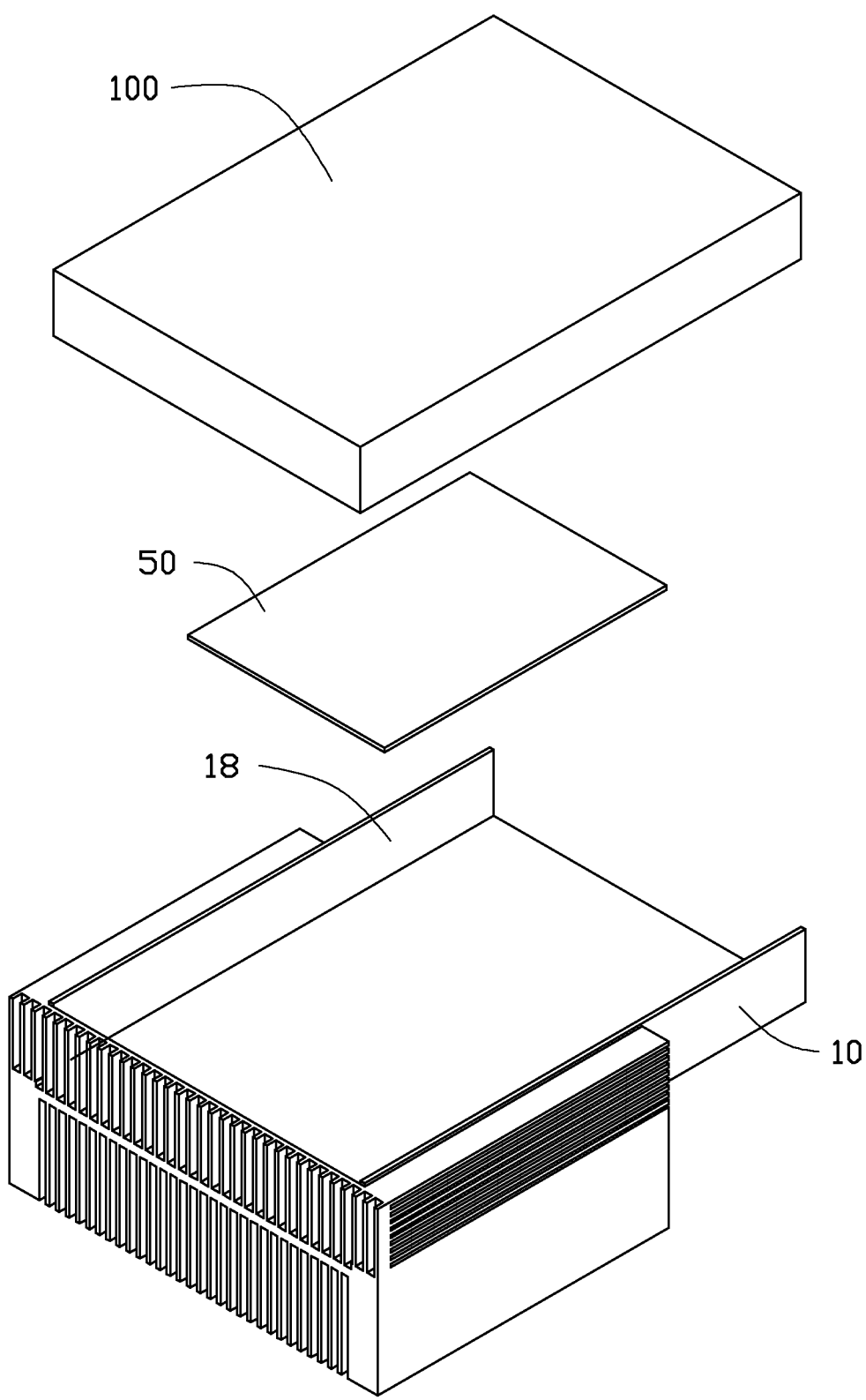
FIG. 4 is similar to FIG. 1, but added with a thermal-dissipating pad between the disk drive bracket and the disk drive.

In other embodiments, to allow heat generated by the disk drive 100 to be efficiently conducted to the receiving box 10, as shown in FIG. 4, a thermal-dissipating pad 50 is positioned between the disk drive 100 and the receiving box 10, thereby allowing heat generated by the disk drive 100 to be quickly conducted to the receiving box 10. The disk drive bracket 1 can be cast to enhance heat conduction and anodized to improve efficiency of heat radiation.

It is to be understood, however, that even though numerous characteristics and advantages have been set forth in the foregoing description of embodiments, together with details of the structures and functions of the embodiments, the present disclosure is illustrative only and changes may be made in detail, especially in matters of shape, size, and arrangement of parts within the principles of the present disclosure to the full extent indicated by the broad general meaning of the terms in which the appended claims are expressed.

What is claimed is:

1. A disk drive bracket comprising:
a receiving box configured for receiving a disk drive; and
a thermal-dissipating module wrapped on and in contact with an exterior surface of the receiving box, the thermal-dissipating module comprising a plurality of fins extending from the thermal-dissipating module opposite to the receiving box.

2. The disk drive bracket of claim 1, wherein the receiving box comprises a support board and two sidewalls extending from opposite sides of the support board; and the support board and the sidewalls bound a receiving space configured for receiving the disk drive.

3. The disk drive bracket of claim 2, wherein the thermal-dissipating module comprises a first thermal-dissipating portion disposed on and in contact with an exterior surface of the support board.

4. The disk drive bracket of claim 3, wherein the first thermal-dissipating portion comprises a first base wall in contact with the exterior surface of the support board; and the plurality of fins comprises a plurality of first fins extending from the first base wall opposite to the support board.

5. The disk drive bracket of claim 4, wherein the thermal-dissipating module further comprises two second thermal-dissipating portions respectively disposed on and in contact with exterior surfaces of the sidewalls and connected to opposite sides of the first thermal-dissipating portion.

6. The disk drive bracket of claim 5, wherein each of the second thermal-dissipating portions comprises a second base wall in contact with the exterior surface of the corresponding sidewall; and the plurality of fins comprises a plurality of second fins extending from the second base wall opposite to the corresponding sidewall.

7. The disk drive bracket of claim 6, wherein the thermal-dissipating module further comprises a third thermal-dissipating portion positioned at an end of the support board and flush with the first and second thermal-dissipating portions.

8. The disk drive bracket of claim 7, wherein the third thermal-dissipating portion comprises a third base wall connected among the first and second base walls of the first and second thermal-dissipating portions; and the plurality of fins comprises a plurality of third fins extending from the third base wall opposite to the end of the support board.

9. The disk drive bracket of claim 1, further comprising a thermal-dissipating pad positioned in the receiving box, configured for allowing heat generated by the disk drive to be conducted to the receiving box.

10. The disk drive bracket of claim 1, wherein the disk drive bracket is cast.

11. The disk drive bracket of claim 1, wherein the disk drive bracket is anodized.

* * * * *